United States Patent [19]

Tateishi

[11] Patent Number: 4,827,464

[45] Date of Patent: May 2, 1989

[54] SLIDER SERVO DEVICE

[75] Inventor: Kiyoshi Tateishi, Saitama, Japan

[73] Assignee: Pioneer Electronic Corporation, Tokyo, Japan

[21] Appl. No.: 112,207

[22] Filed: Oct. 26, 1987

[30] Foreign Application Priority Data

Oct. 24, 1986 [JP] Japan .................. 61-253315
Oct. 24, 1986 [JP] Japan .................. 61-253316

[51] Int. Cl.$^4$ ............................................. G11B 7/00
[52] U.S. Cl. ........................................................ 369/44
[58] Field of Search ............... 369/44, 45, 46, 43; 250/201, 202, 203, 204; 358/342

[56] References Cited

U.S. PATENT DOCUMENTS

| | | | |
|---|---|---|---|
| 4,344,165 | 8/1982 | Akiyama | 369/44 |
| 4,627,038 | 12/1986 | Abed et al. | 369/44 |
| 4,627,039 | 12/1986 | Meyer | 369/44 |
| 4,646,278 | 2/1987 | Okano | 369/32 |
| 4,700,334 | 10/1987 | Shinkai | 369/44 |
| 4,748,610 | 5/1988 | Nakata et al. | 369/44 |
| 4,764,860 | 8/1988 | Takao | 369/43 |

Primary Examiner—William L. Sikes
Assistant Examiner—Frank González
Attorney, Agent, or Firm—Sughrue, Mion, Zinn, Macpeak & Seas

[57] ABSTRACT

A slider servo device in which a quantity of deviation of an information reading spot of a pickup from a recording track of an information recording disk in the radial direction of the disk is corrected, a servo amplifier for receiving a low-band component of a tracking error signal corresponding to the quantity of deviation is provided. The servo amplifier has a first gain and a second gain smaller than the first gain. The slider servo device also has a slider unit for moving the pickup in the radial direction of the disk depending upon the level of the output from the servo amplifier. The slider unit has a dead zone such that an output for driving the pickup cannot be generated until the absolute value of the level of the input to the slider unit reaches a prescribed magnitude. The first gain is selected for high-speed movement of the pickup, and the second gain is selected for the normal-speed movement or low-speed movement of the pickup. In another embodiment of the invention, the first gain is selected when the level of the input to the amplifier is low and the first gain is replaced by the second gain when the absolute value of the level of the input from the amplifier is proximate to the prescribed magnitude of the level of the input to the slider unit.

2 Claims, 4 Drawing Sheets

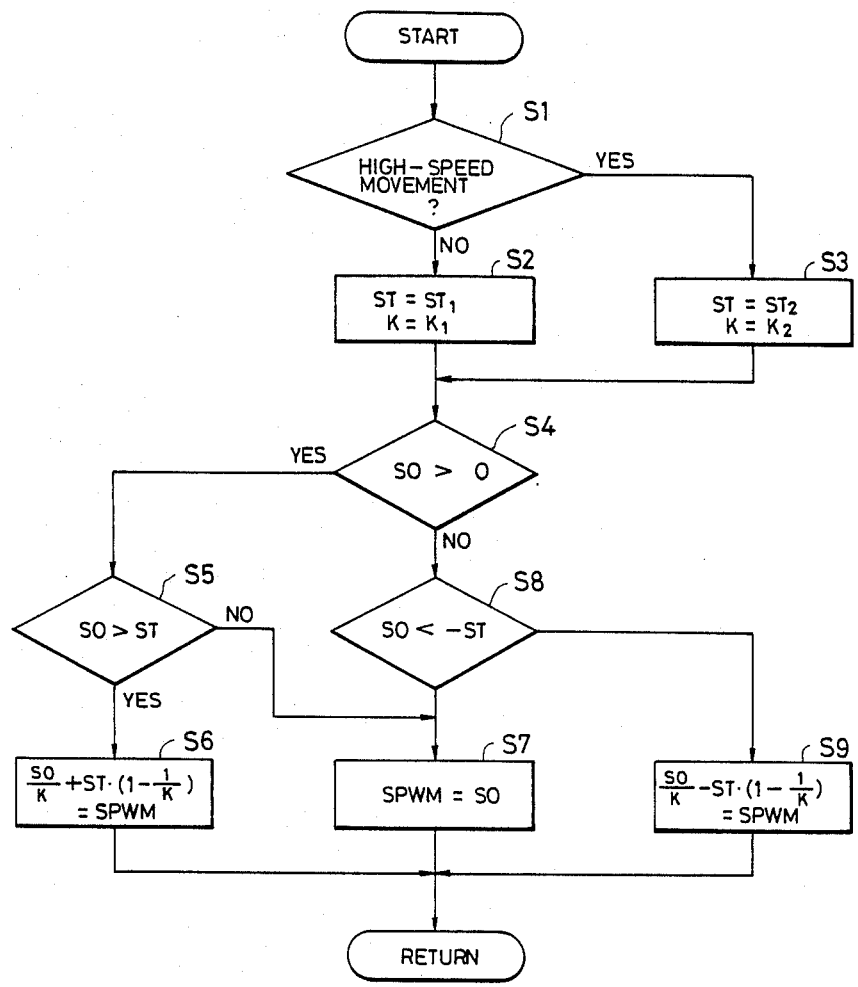

SLIDER SERVO DEVICE

BACKGROUND OF THE INVENTION

The present invention relates to a slider servo device, particularly to a servo device for a slider which can be moved in the radial direction of an information recording disk (hereinafter also called "the disk") while bearing a pickup for reading recorded information from the disk.

Since the recording track of an information recording disk extends continuously and vertically from the innermost portion of the recording region of the track to the outermost portion thereof, an information reading spot made by a pickup needs to be moved from the innermost portion to the outermost portion. For that reason, a slider servo device for moving the pickup between the innermost and outermost portions of the recording region while maintaining an accurate positional relationship between the information reading spot of the pickup and the recording track of the disk in the radial direction of the disk is indispensable. The slider servo device functions so that a slider which can be moved in the radial direction of the disk while bearing the pickup, is controlled depending upon the low-band component of a tracking error signal corresponding to the quantity of deviation of the reading spot from the recording track in the radial direction of the disk. A wide range of speed is required. The range includes the normal speed of slider movement for normal-speed picture reproduction, the low speed of slider movement for low-speed picture reproduction or still picture reproduction and the high speed of slider movement for triple-speed picture reproduction or searching. In addition the slider needs to accurately and instantaneously follow abrupt changes in the mode (speed) of slider movement.

A slider unit generally has a "dead zone" such that a driving output cannot be generated until the absolute value of the level of the input to the slider unit reaches a prescribed magnitude. For that reason, at the time of the normal-speed picture reproduction or the low-speed picture reproduction or the still picture reproduction, error components are integrated and accumulated in the dead zone. If the servo gain of the slider servo device is too high when a first edge of the dead zone is exceeded, the slider is abruptly moved in the reverse direction (which is such a direction as to make the error zero) so that the second edge, opposite to the first edge, of the dead zone is exceeded. As a result, the slider is again abruptly moved in the new reverse direction, and the first edge of the dead zone is again exceeded. Consequently, the slider goes into a state of oscillation. However, if the loop gain of the slider servo device is set too low, the responsiveness of the slider deteriorates at the time of abrupt application of an error component to the slider in the high-speed movement thereof for the triple-speed picture reproduction, searching or the like. In the worst case, a tracking actuator goes out of the angle of a field of vision so that the slider servo device no longer properly operates.

SUMMARY OF THE INVENTION

An object of the present invention is to solve the above-mentioned problems.

Accordingly, it is an object of the present invention to provide a slider servo device in which the effective width of the dead zone of a slider unit is reduced to thereby enhance reproducibility.

The slider servo device according to the present invention includes a slider unit having a dead zone which is such that a driving output cannot be generated until the absolute value of the level of the input to the slider unit reaches a prescribed magnitude. In the inventive slider servo device, a first servo gain and a second servo gain smaller than the first can be switched with one another.

BRIEF DESCRIPTION OF THE DRAWINGS

The above-mentioned objects, features and advantages, as well as additional objects, features and advantages, of the invention will be more evident upon reading the detailed description of the invention in conjunction with the drawings, in which:

FIG. 5 shows a flow chart of steps which are taken by the microprocessor according to a second variation of the device of FIG. 3.

DETAILED DESCRIPTION OF THE PREFERRED EMBODIMENTS

Embodiments of the present invention are hereafter described in detail with reference to the drawings.

Figure 1:
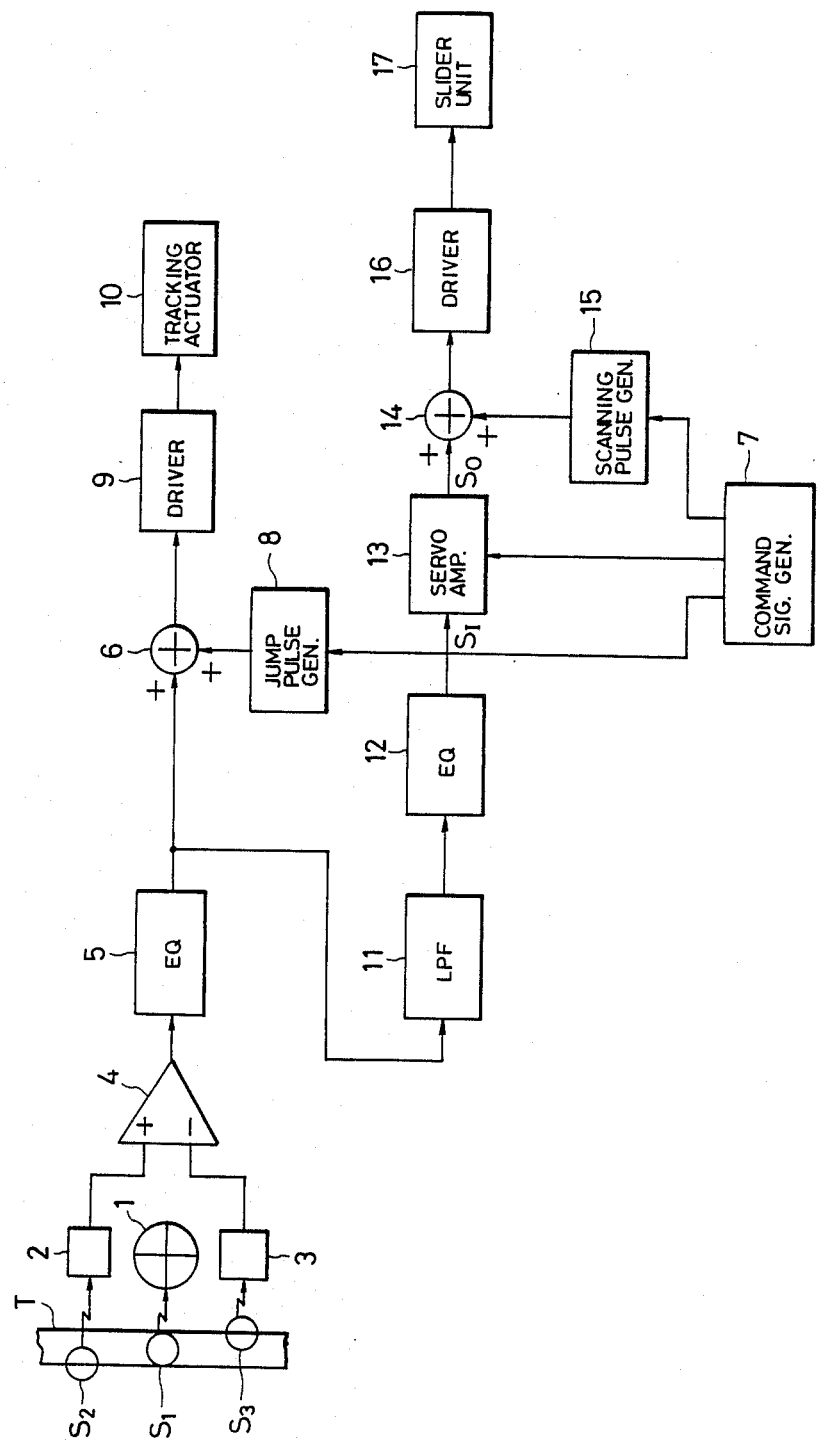
FIG. 1 shows a block diagram of an apparatus including a slider servo device according to the present invention.

FIG. 1 shows a block diagram of an apparatus, including a slider servo device according to a first embodiment the invention. As shown in FIG. 1, three beam spots, which are made by converging laser beams, constitute a recorded information reading spot $S_1$ and a pair of tracking information detecting spots $S_2$ and $S_3$. The detecting spots $S_2$ and $S_3$ respectively precede and follow the recorded information reading spot $S_1$ as an information recording disk and the spot $S_1$ are moved relative to each other. The beam spots are made on the recording track T of the disk by irradiating the laser beams from a pickup (not shown). Light reflected from the disk as a result of making the spots $S_1$, $S_2$ and $S_3$ thereon is applied to photoelectric converters 1. 2 and 3 built in the pickup.

The photoelectric converter 1 comprises four light reception elements which are independent of each other and whose light reception surfaces are divided from each other by two straight lines perpendicularly intersecting each other. The sum of the outputs from the light reception elements is a reproduced RF (i.e. high frequency) signal.

The outputs from the photoelectric converters 2 and 3 are supplied to a differential amplifier 4 so that the difference between both the outputs is detected. The output from the amplifier 4, which corresponds to the difference, is a tracking error signal. After the tracking error signal is subjected to a prescribed phase compensation by an equalizer circuit 5, the signal is supplied as one input to an adder 6. A jump pulse produced by a jump pulse generation circuit 8 in response to a jump command issued by a command signal generation circuit 7 is supplied to another input of the adder 6. The output from the adder 6 is supplied to a tracking actuator 10 through a drive circuit (driver) 9. The tracking actuator 10 moves the information reading spot $S_1$ along the radius of the disk in a direction and a quantity which correspond to the polarity and level of the input voltage to the tracking actuator, to cause the spot $S_1$ to accurately follow the center line of the recording track T. A tracking servo loop is thus formed.

The tracking error signal processed through the equalizer circuit 5 is also supplied to a low-pass filter 11. The component (a low-band component) of the tracking error signal which has passed through the low-pass filter 11 is subjected to a prescribed phase compensation by an equalizer circuit 12 and thereafter supplied to a servo amplifier 13, the output of which is supplied as one input to an adder 14. A scanning pulse produced by a scanning pulse generation circuit 15 in response to a scanning command issued by the command signal generation circuit 7 is supplied as another input to the adder 14. The output of the adder 14 is supplied to a slider unit 17 through a drive circuit (driver) 16. The slider unit 17 moves the pickup along the radius of the disk in a direction and a quantity which correspond to the polarity and level of the input voltage to the slider unit. A slider servo loop is thus formed.

In this first embodiment, the servo amplifier 13 has a first gain and a second gain smaller than the first. The first and the second gains are switched with one another depending upon slider movement mode information supplied by the command signal generation circuit 7. The second gain is selected for the normal-speed movement for normal-speed picture reproduction or the low-speed movement of the slider for low-speed picture reproduction or still picture reproduction. The first gain is selected for the high-speed movement of the slider for triple-speed picture reproduction, a jump in reversing or searching or the like.

Figure 2A:
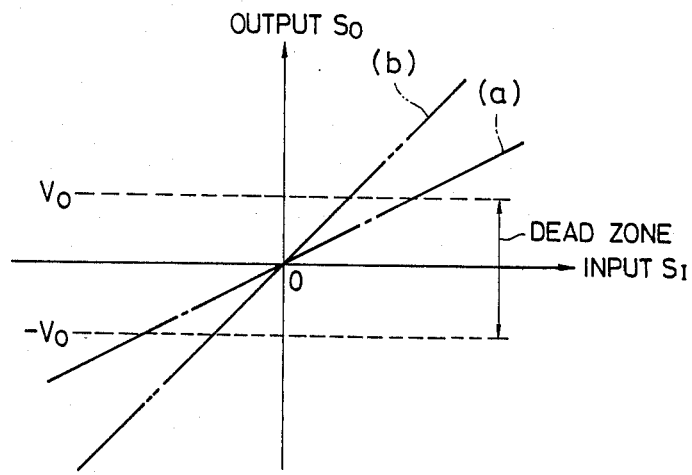
FIGS. 2A and 2B show diagrams of input/output characteristics attained through operation of the device of FIG. 1.

When the second gain is selected, an input/output characteristic (a) having a smaller inclination as shown by a one-dot chain line in FIG. 2A is attained. When the first gain is selected, another input/output characteristic (b) having a larger inclination as shown by a two-dot chain line in FIG. 2A is attained. For these reasons, even though the slider unit 17 has a dead zone defined by threshold levels $V_O$ and $-V_O$, the slider is not abruptly moved when the output level $S_O$ of the servo amplifier 13 has exceeded the level $V_O$ or $-V_O$, because the gain of the amplifier is set smaller in the normal-speed picture reproduction, the low-speed picture reproduction or the still picture reproduction. Consequently, the slider does not enter a state of oscillation. Since the gain of the servo amplifier 13 is set larger in the triple-speed picture reproduction or the jump in reversing or searching the error of the slider is quickly suppressed without adversely affecting the responsiveness of the slider.

Figure 3:
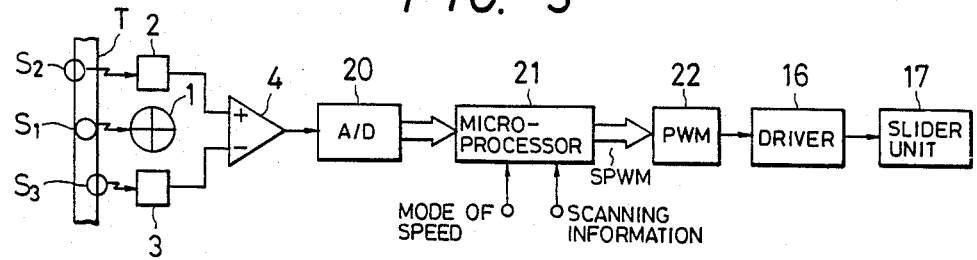
FIG. 3 shows a block diagram of another slider servo device, including a microprocessor, according to the present invention.

Although changing the servo gain is performed using hardware in the above-described first embodiment, it can be also performed using software by using a microprocessor as shown in FIG. 3 (in which only the constitution of a slider servo system is shown). In this software variation of the first embodiment, the same elements in FIGS. 1 and 3 are denoted by the same reference symbols therein. Changing the servo gain by using the microprocessor is now described with reference to FIG. 3.

The tracking error signal sent out from the differential amplifier 4 is changed into a digital signal by an A/D (analog/digital) converter 20. The digital signal is supplied to the microprocessor 21. Scanning information and other information indicative of the movement mode (which is a low-speed movement mode, a normal-speed movement mode or a high-speed movement mode) of the slider are supplied to the microprocessor 21 from an external source. The microprocessor 21 performs a filtering calculation on the digital tracking error signal to determine the low-band component of the signal, and performs a prescribed equalizing calculation on the low-band component and calculation based on the gain corresponding to the mode of the movement of the slider. At the time of scanning, the microprocessor 21 sends out scanning pulse levels corresponding to slider movement direction information and scanning speed information. A PWM generation circuit 22 converts the digital output from the microprocessor 21 into an analog signal corresponding to the width of the output pulse from the microprocessor. The analog signal is applied to the slider unit 17 through the drive circuit 16.

Figure 4:
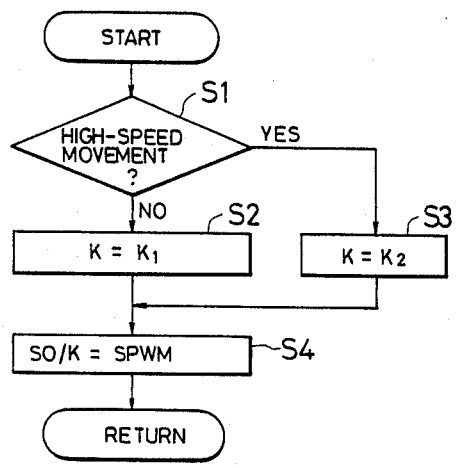
FIG. 4 shows a flow chart of steps which are taken by the microprocessor according to a first variation of the device shown in FIG. 3.

Changing the servo gain by use of the microprocessor 21 is now further described with reference to a flow chart shown in FIG. 4. From the slider movement information supplied from an external source, it is judged in a step $S_1$ whether or not the high-speed movement of the slider is performed. When it is judged in the step $S_1$ that the high-speed movement is not performed, namely, the normal-speed or the low-speed movement of the slider is performed, a calculation coefficient K for the servo gain is set at $K_1$ in a step S2. When the high-speed movement is performed, the calculation coefficient K is set at $K_2$ in a step S3. An error signal SPWM is computed from the calculation coefficient in accordance with a calculation formula SO/K in a step S4. As a result, the input/output characteristic (a) having the smaller inclination as shown by the one-dot chain line in FIG. 2A is attained for the normal-speed the low-speed or the still picture reproduction, or the input/output characteristic (b) having the larger inclination as shown by the two dot chain line in FIG. 2A is attained for the triple-speed picture reproduction or the jump in reversing or searching, he same effect is thus produced as that of the above-described hardware variation of the first embodiment.

In the above-described first embodiment of a slider servo device including the slider having the dead zone, the servo gain is changed depending upon the mode of the movement of the slider to attain the input/output characteristic corresponding to the mode, as described above. As a result, the effective width of the dead zone is reduced without adversely affecting the responsiveness of the slider, so that reproducibility is enhanced.

Figure 2B:
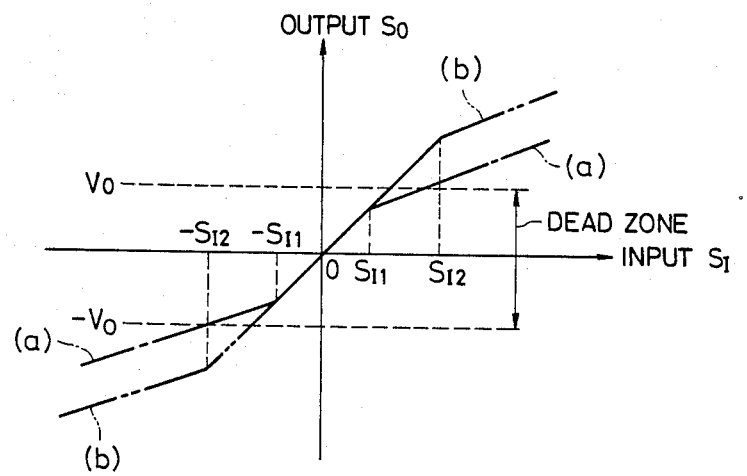

A second embodiment of the invention involves a variation (as explained below) of the device of FIG. 1, and therefore will be hereafter described with reference to FIG. 1, for the sake of simplicity. In the second embodiment, a servo amplifier 13 (FIG. 1) has a first gain and a second gain smaller than the first. The first and the second gains are switched with one another depending upon an input level $S_I$ and a command given by a command signal generation circuit 7. In the low-speed or normal-speed movement of a slider, the first gain is selected when the input level $S_I$ is low. The first gain is replaced by the second gain when the input level $S_I$ is such that an output level $S_O$ is near either of the threshold levels $V_O$ and $-V_O$ which indicate the width of the dead zone, for example, when the input level $S_I$ has become either of $S_{I1}$ and $-S_{I2}$ which are such that the output level $S_O$ is a prescribed value which is within the dead zone. In the high-speed movement of the slider, the first gain is selected when the input level $S_I$ is low, and the first gain is replaced by the second gain when the input level $S_I$ has become either of $S_{I1}$ and $-S_{I2}$ which are such that the output level $S_O$ is a prescribed value which is outside the dead zone. Because of the above-described changing of the gains with each other, a nonlinear input/output characteristic (a) shown by a one-dot chain line in FIG. 2B is attained for the normal-speed, the low-speed or the still picture reproduction, and another nonlinear input/output characteristic (b) shown by a two-dot chain line is attained for the triple-speed picture reproduction or the jump in reversing or searching. As a result, even though the slider unit 17 has the dead zone defined by the levels $V_O$ and $-V_O$, the gain is decreased when the output level $S_O$ of the servo amplifier 13 has reached the prescribed value within the dead zone, in the normal-speed picture reproduction or the still picture reproduction, so that the slider is prevented from being abruptly moved when an error component has gone out of the dead zone. For that reason, the slider does not enter into a state of oscillation. In the triple-speed picture reproduction or the jump in reversing or searching, the gain is changed when the output level $S_O$ of the servo amplifier 13 has reached the prescribed value which is outside the dead zone, so that an error is quickly suppressed without adversely affecting the responsiveness of the slider.

In the second embodiment, similar to as in the first embodiment, changing the servo gain can also be performed using software by using a microprocessor. This software variation of the second embodiment will be described with reference to FIG. 3, as it is similar to the software variation of the first embodiment except as described below. In this case, the microprocessor 21 performs a filtering calculation on a digital tracking error signal to determine the low-band component of the signal, and performs a prescribed equalizing calculation on the low-band component of the signal, and linearizing calculation corresponding to the mode of the movement of the slider, on the basis of the level of the signal.

Changing the servo gain by using the microprocessor 21 is now described with reference to a flow chart shown in FIG. 5. From slider movement mode information supplied from an external source, it is judged in a step S1 whether or not the high-speed movement of the slider is performed. When the high-speed movement is not performed, namely, the normal-speed movement or the low-speed movement is performed, a bent input level ST is set at $ST_1$ which is such that the absolute value of a sent-out error signal from the microprocessor 21 is a prescribed magnitude smaller than a level $ST_O$ indicative of one edge of the dead zone, and a calculation coefficient K corresponding to the servo gain is set at $K_1$, in a step S2. When it is judged in the step S1 that the high-speed movement of the slider is performed, the bent input level ST is set at $ST_2$ which is such that the absolute value of the sent-out error signal SPWM from the microprocessor 21 is a prescribed magnitude larger than the level $ST_O$, and the calculation coefficient K is set at $K_2$, in a step S3. It is then judged in a step S4 whether or not an input level SO before non-linearization is positive. When the input level SO is positive, it is judged in a step S5 whether or not the input level is larger than the bent input level ST. When the input level SO is larger than the bent input level ST, the error signal SPWM is calculated in accordance with a formula $(SO/K)+ST\{1-(1/K)\}$ in a step S6. When it is judged in the step S5 that the input level SO is not larger than the bent input level ST. the input level SO is sent out as the error signal SPWM in a step S7.

Figure 6:
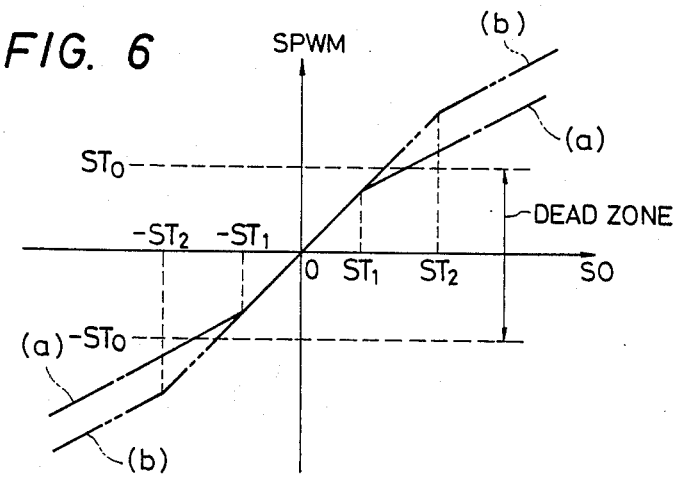
FIG. 6 shows diagrams of input/output characteristics attained by taking the steps shown in FIG. 5.

Referring back to step S4, when the input level SO before non-linearization is not positive, it is judged in a step S8 whether or not the input level SO is smaller than a bent input level $-ST$. When the input level SO is smaller than the bent input level $-ST$. the error signal SPWM is calculated in accordance with a formula $(SO/K)=ST\{1-(1/K)\}$ in a step S9. When the input level SO is not smaller than the bent input level $-ST$, the step S7 is taken. In the calculation in the steps S6 and S9, the values set depending upon the mode of the movement of the slider in the step S2 or S3 are used as the bent input level ST and the calculation coefficient K. As a result, a nonlinear input/output characteristic (a) shown by a one-dot chain line in FIG. 6 is attained for the normal-speed, the low-speed or the still picture reproduction and a nonlinear input/output characteristic (b) shown by a two-dot chain line in FIG. 6 is attained for the triple-speed reproduction or the jump in reversing or searching. The same effect is thus produced.

In the second embodiment which is a slider servo device including the slider having the dead zone, the servo gain is changed depending upon the level of the error signal to the dead zone, to make the output for the slider nonlinear. As a result, the effective width of the dead zone is reduced without adversely affecting the responsiveness of the slider, so that reproducibility is enhanced.

Although one of the two input/output characteristics (a) and (b) is used depending upon the mode of the movement of the slider in each of the above-described embodiments, the present invention is not confined thereto but may be otherwise embodied so as to basically perform non-linearization to enable a single input/output characteristic to cope with all the modes of the movement of the slider. However, using one of the two input/output characteristics (a) and (b) depending on the mode of the movement of the slider is preferable from the viewpoint that the effective width of the dead zone is reduced without adversely affecting the responsiveness of the slider.

What is claimed is:

1. A slider servo device for correcting a quantity of deviation of the information reading spot of a pickup from the recording track of an information recording disk in the radial direction of said disk, comprising:
    means for generating a tracking error signal corresponding to the quantity of deviation, said tracking error signal having a low-band component;
    an amplification means, which receives the low-band component, for generating an output, wherein said amplification means has a first gain and a second gain smaller than the first gain; and
    a slider unit for moving said pickup in the radial direction of said disk depending upon the level of the output from said amplification means, said slider unit having a dead zone such that a driving output cannot be generated until the absolute value of the level of the input to said slider unit reaches a prescribed magnitude, wherein said first gain is selected for high-speed movement of said pickup, and said second gain is selected for normal-speed movement or low-speed movement of said pickup.

2. A slider servo device for correcting a quantity of deviation of the information reading spot of a pickup from the recording track of an information recording disk in the radial direction of said disk, comprising:
    means for generating a tracking error signal corresponding to the quantity of deviation, said tracking error signal having a low-band component;
    an amplification means, which receives the low-band component, for generating an output, wherein said amplification means has a first gain and a second gain smaller than the first gain; and
    a slider unit for moving said pickup in the radial direction of said disk depending upon the level of the output from said amplification means, said slider unit having a dead zone such that a driving output cannot be generated until the absolute value of the level of the input to said slider unit reaches a prescribed magnitude, wherein said first gain is selected when the level of the input to said amplification means is low, and said first gain is replaced by said second gain when the absolute value of the level of the input from said amplification means is proximate to said prescribed magnitude.

* * * * *